(12) United States Patent
Yang

(10) Patent No.: US 7,144,276 B1
(45) Date of Patent: Dec. 5, 2006

(54) MEMORY CARD CONNECTOR

(75) Inventor: Mei Chuan Yang, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 11/367,479

(22) Filed: Mar. 6, 2006

(51) Int. Cl.
*H01R 24/00* (2006.01)

(52) U.S. Cl. .................. 439/630; 439/327; 361/756

(58) Field of Classification Search .............. 439/59, 439/237, 331, 630, 928.1; 361/740, 741, 361/752, 756, 759
See application file for complete search history.

(56) References Cited

U.S. PATENT DOCUMENTS

| | | | | |
|---|---|---|---|---|
| 5,934,919 | A * | 8/1999 | Cross et al. | 439/136 |
| 6,269,005 | B1 * | 7/2001 | Tung et al. | 361/737 |
| 6,422,469 | B1 * | 7/2002 | Pernet | 235/486 |
| 6,602,096 | B1 * | 8/2003 | Kronestedt et al. | 439/630 |
| 6,695,637 | B1 * | 2/2004 | Liu | 439/377 |
| 6,760,228 | B1 * | 7/2004 | Chi et al. | 361/737 |

* cited by examiner

*Primary Examiner*—Thanh-Tam Le
(74) *Attorney, Agent, or Firm*—Rosenberg, Klein & Lee

(57) ABSTRACT

A memory card connector includes a base member, a plurality of contacts held on the base member and a slide cover slidably engaging with the base member. The base member has a rear opening, a pair of longitudinal guiding slots respectively defined at two opposite sides thereof, and a pair of locking tab disposed thereon. The sliding cover has a card cavity for receiving a memory card, an engaging slot defined at a rear portion thereof corresponding to the rear opening, and a pair of slide arms for sliding in the corresponding guiding slots. Each slide arm extends forwards to form a resilient arm with a locking recess defined therein for engaging with the corresponding locking tab. Therefore, as used in a cellular phone, the memory card connector can facilitate insertion/extraction of the memory card and hold the memory card reliably and exactly therein.

9 Claims, 3 Drawing Sheets

MEMORY CARD CONNECTOR

BACKGROUND OF THE INVENTION

1. Field of the Invention

The present invention relates generally to a card connector, and particularly, to a memory card connector which is so structured that it can facilitate insertion/extraction of a memory card thereinto/therefrom and hold the inserted memory card reliably and exactly therein.

2. The Related Art

Recently, because of the multi-function combination and greater compactness of the cellular phone or the like, there is an extensive need of a TransFlash memory card having larger storage and smaller size, and correspondingly, various types of memory card connectors have been designed for conforming to the TransFlash memory card structure.

These existing memory card connectors commonly include a dielectric housing which holds a plurality of contacts therein, and a cover mating with the housing to form a card cavity for inserting of a memory card. As one of these conventional memory card connectors is assembled in the back shell of a cellular phone, the memory card is inserted and held in the card cavity of the memory card connector for use in storing various data taken by the cellular phone as a recording medium. If not in use, the inserted memory card can be pulled out from the card cavity of the memory card connector after the back shell of the cellular phone has been opened.

However, since such conventional memory card connector as above has no specialized locking mechanism for reliably and exactly positioning the inserted memory card in the card cavity, there has been a risk that the inserted memory card may drop out from the card cavity when an impact force is applied from the exterior. In addition, the aforementioned memory card connector assembled in the back shell of the cellular phone causes great inconvenience to the insertion/extraction of the memory card with time wasting.

SUMMARY OF THE INVENTION

Therefore, it is an object of the present invention to solve the above problems and provide a memory card connector, which facilitates insertion/extraction of a memory card with saving time, and holds the inserted memory card reliably and exactly therein.

According to the present invention, a memory card connector comprises a dielectric base member, which includes a rear opening formed at a rear portion thereof, a pair of longitudinal guiding slots respectively defined at two opposite sides thereof adjacent to the rear opening, and at least one locking tab disposed thereon and extending into one of the guiding slot. A plurality of contacts is held on the base member for making electrical connection with a memory card. A slide cover has a card cavity for receiving the memory card, an engaging slot defined at a rear portion thereof adjacent to the card cavity and corresponding to the rear opening of the base member, and a pair of slide arms which is respectively formed at two opposite sides thereof for sliding in the corresponding guiding slots of the base member. Each slide arm extends forwards to form a resilient arm. At least one of the resilient arms has a locking recess defined therein for engaging with the locking tab of the base member.

On the basis of mentioned above, when the memory card connector is installed in the back shell of a cellular phone, the slide cover is conveniently pulled out of the cellular phone so that the memory card is conveniently inserted into the card cavity of the slide cover and slides along with the slide cover into the cellular phone until the locking recess of the slide cover engages with the locking tab of the base member disposed in the cellular phone. Thus, the memory card can be reliably and exactly positioned in the memory card connector to make proper electrical connection with the contacts on the base member. In addition, the slide cover mounted with the memory card can be conveniently pulled out of the cellular phone for extracting of the memory card from the memory card connector. Therefore, comparing with the prior art, the memory card connector 100 according to the present invention also can facilitate insertion/extraction of the memory card with saving much time.

BRIEF DESCRIPTION OF THE DRAWINGS

A detailed explanation of a preferred embodiment of the present invention will be given, with reference to the attached drawings, for better understanding thereof to those skilled in the art.

DETAILED DESCRIPTION OF THE PREFERRED EMBODIMENT

Figure 1:
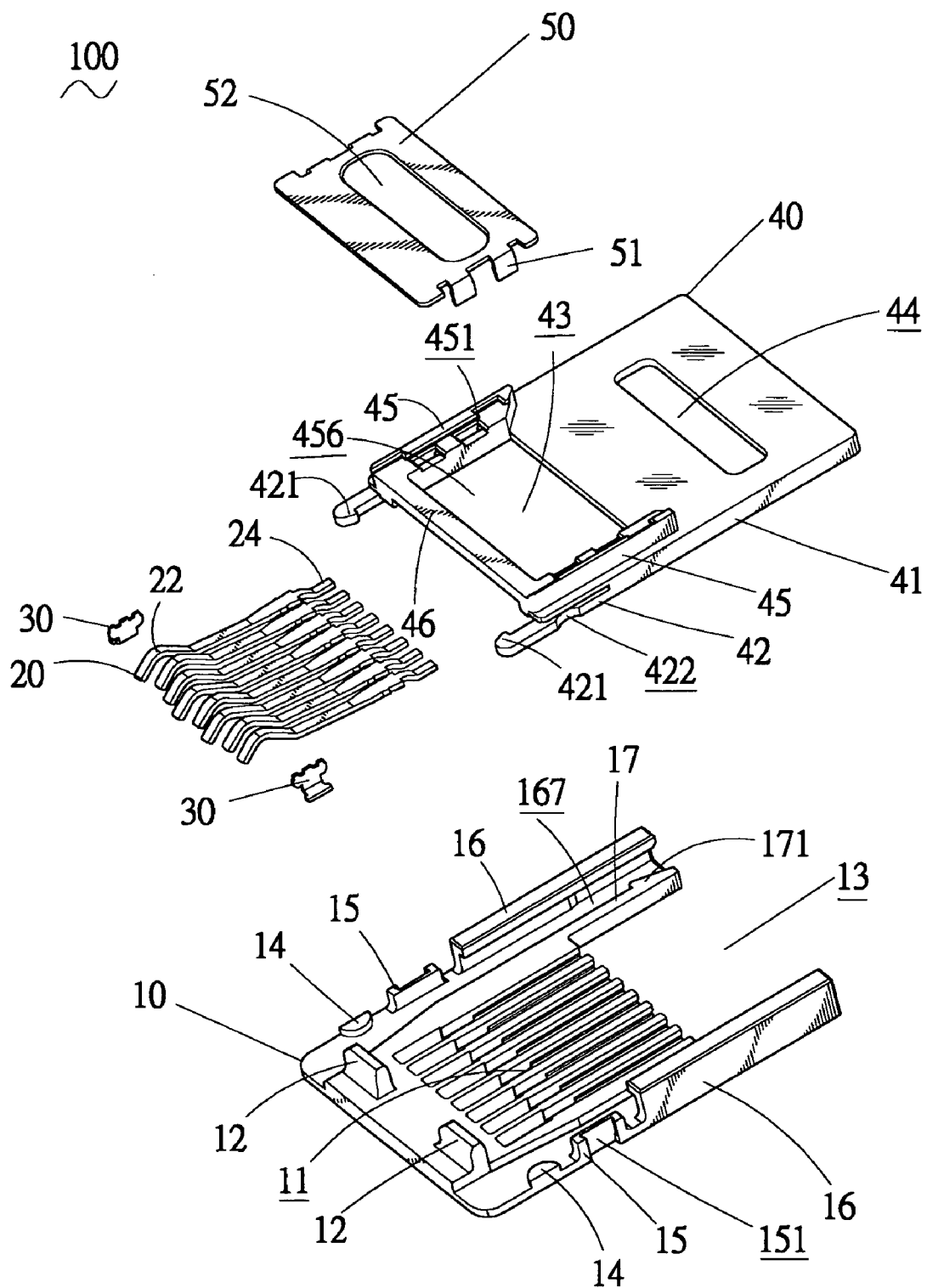
FIG. 1 is an exploded perspective view of a memory card connector in accordance with the present invention.
Figure 2:
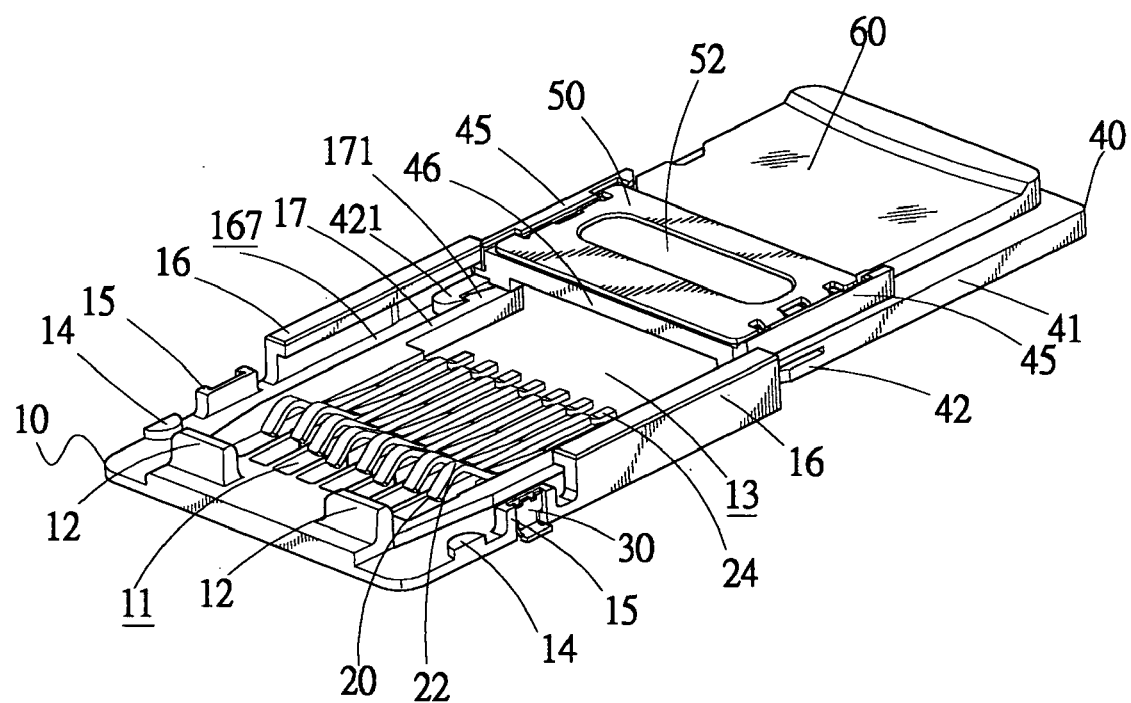
FIG. 2 is a perspective view of a memory card connector with a memory card installed in a pre-stage position.

With reference to FIGS. 1 and 2, the memory card connector 100, in accordance with the present invention, comprises a dielectric base member 10 that holds a plurality of contacts 20 thereon. Each contact 20 has a contact section 22 for making electrical connection with a memory card 60 and a solder section 24 connecting with the contact section 22 for making electrical and mechanical connection with an external circuit board (not shown) by soldering. A slide cover 40 slidably engages with the base member 10 and has an upper lid 50 disposed thereon for securing the memory card 60 between the slide cover 40 and the upper lid 50. In the present embodiment, the memory card 60 is a Transflash memory card.

The base member 10 is constructed with a pair of locking arms 17 disposed at a rear portion thereof and a rear opening 13 formed between the locking arms 17. Each locking arm 17 further has a positioning hook 171 extending outwardly from the free end thereof for attaching the slide cover 40 to the base member 10. A pair of lateral walls 16 each having a reversed L-shape extends upwards from two opposite sides of the base member 10 respectively, with a pair of longitudinal guiding slots 167 respectively defined between the lateral walls 16 and the locking arm 17 on the same side. The guiding slots 167 extend forwards to the front end of the base member 10 with gradual widening for guiding the sliding of the slide cover 40 on the base member 10. A pair of locking tabs 14 and projecting blocks 15 are respectively disposed on the two opposite sides of the base member 10, with the locking tab 14 and projecting block 15 on the same side arranged in separated relationship and each locking tab 14 extending into the corresponding guiding slot 167. Each projecting block 15 has a recess 151 penetrating in the thickness direction in the outside surface thereof for holding a fixing slice 30. The fixing slices 30 are employed for fixing the base member 10 on the external circuit board (not shown). Further, the base member 10 has a plurality of contact grooves 11 extending along the longitudinal direction thereof in front of the rear opening 13 for receiving the corresponding contacts 20 respectively, and a pair of stops 12 extending upwards on a front portion thereof adjacent to the contact grooves 11 for stopping the sliding of the slide cover 40.

The slide cover 40 is formed with a front opening 43 defined at a front portion thereof and an engaging slot 44 defined at a rear portion thereof corresponding to the rear opening 13 of the base member 10. A pair of flanges 45 respectively extends upwards from the top surface of the slide cover 40 at two opposite sides of the front opening 43. Each flange 45 has a pair of mounting notch 451 arranged in the top surface thereof. A beam 46 is configured with the front end of each flange 45, thereby defining a card cavity 456 communicating with the front opening 43 for inserting of the memory card 60. The upper lid 50 is employed for covering the card cavity as shown in FIG. 2. The upper lid 50 has two pairs of mounting legs 51 respectively extending downwards from two opposite sides thereof for engaging with the corresponding mounting notches 451 so as to fix the upper lid 50 on the slide cover 40. The upper lid 50 is further provided with a middle boss 52 extending downwards to hold the inserted memory card 60 reliably in the card cavity 456 of the slide cover 40. In addition, the slide cover 40 is provided with a pair of slide arms 41 respectively extending downwards from two opposite sides thereof for sliding in the corresponding guiding slots 167 of the base member 10. Each slide arm 41 further extends forwards to form a resilient arm 42 in a cantilever manner, which has a projecting hook 421 disposed at the free end thereof for engaging with the positioning hook 171 of the corresponding locking arm 17. A locking recess 422 corresponding to the locking tab 14 of the base member 10 is defined in the middle section on the outside surface of each resilient arm 42.

Figure 3:
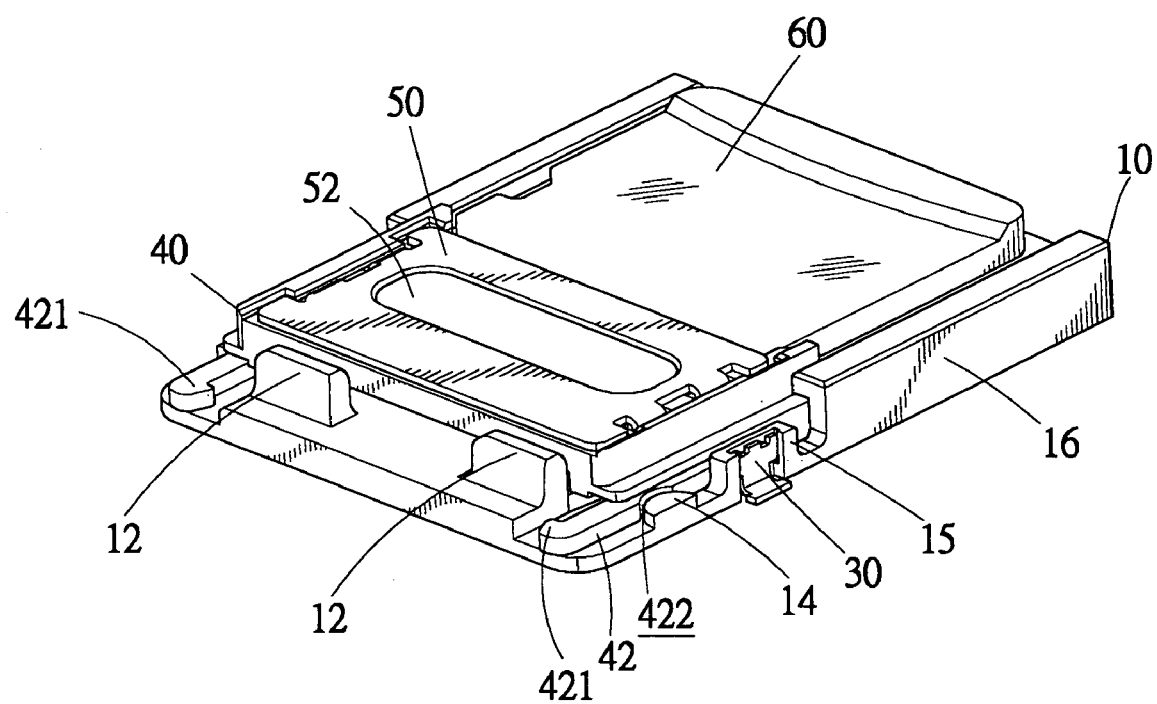
FIG. 3 is a perspective view of a memory card connector with a memory card installed in a fully assembled position.

Referring now to FIGS. 2 and 3, in assembling of the memory card connector 100 according to the present invention with the memory card, the contacts 20 are respectively mounted in the corresponding contact grooves 11 of the base member 10, with the solder portion 24 extending out from the rear opening 13 for making electrical and mechanical connection with the external circuit board by soldering. The fixing slices 30 are respectively infixed in the corresponding recesses 151 of the base member 10 for fixing the base member 10 firmly on the external circuit board. Meantime, the upper lid 50 is affixed to the slide cover 40 by the mounting legs 51 thereof respectively engaging with the mounting notches 451 of the slide cover 40. The memory card 60 is inserted and held reliably in the card cavity 456 of the slide cover 40. The slide cover 40 assembled with the memory card 60 is attached to the base member 10 in such a manner that the resilient arms 42 thereof are respectively introduced to the corresponding guiding slots 167 of the base member 10 and the positioning hooks 171 on the locking arms 17 of the base member 10 respectively lock with the projecting hooks 421 of the corresponding resilient arms 42 as shown in FIG. 2, thereby avoiding the slide cover 40 departing from the base member 10. Then, the slide cover 40 with the memory card 60 mounted thereon is pushed to move forwards with the slide arms 41 thereof respectively sliding forwards along the corresponding guiding slots 167, till the stops 12 standing against the beam 46 of the slide cover 40 and stopping the further movement of the slide cover 40. At the same time, the locking recess 422 defined in each resilient arm 42 of the slide cover 40 just engages with the locking tab 14 of the base member 10 on the same side, and thus the memory card 60 mounted on the slide cover 40 is positioned reliably and exactly in the fully assembled position in which the contact sections 22 of the contacts 20 are just exposed to the front opening 43 of the slide cover 40 and make a proper and complete electrical connection with the memory card 60 as shown in FIG. 3.

As the memory card connector 100 in accordance with the present invention is installed in the back shell of a cellular phone, the engaging slot 44 and rear opening 13 of the memory card connector 100 provided for manual manipulation are exposed out of a predetermined mounting hole defined on the cellular phone. When an cellular phone user put his finger in the engaging slot 44 and exerts a light pulling force on the slide cover 40, the slide cover 40 is pulled out from the predetermined mounting hole to the position as shown in FIG. 2. Then, the user directly inserts the memory card 60 into the card cavity 456 of the slide cover 40, and finally pushes the slide cover 40 into the back shell again so as to make the memory card 60 held completely in the back shell and positioned just in the fully assembled position. In addition, when extracting the memory card 60 from the memory card connector 100 installed in the back shell of the cellular phone, the user firstly pulls the slide cover 40 with the memory card 60 mounted thereon out from the predetermined mounting hole of the cellular phone to the position as shown in FIG. 2 by putting his finger in the engaging slot 44 and exerting a light pulling force on the slide cover 40, and then directly extracts the memory card 60 from the card cavity 456 of the slide cover 40. According to mentioned above, depending on the design of the memory card connector 100 with such slide cover 40, there is no need to open the back shell of the cellular phone for insertion or extraction of the memory card 60. Therefore, comparing with the prior art, the memory card connector 100 according to the present invention can facilitate insertion/extraction of the memory card with saving much time.

What is claimed is:

1. A memory card connector comprising:
 a base member, which has a rear opening formed at a rear portion thereof, a pair of longitudinal guiding slots respectively defined at two opposite sides thereof adjacent to the rear opening, and at least one locking tab disposed thereon and extending into one of the guiding slots;
 a plurality of contacts being held on said base member for making electrical connection with a memory card; and
 a slide cover, which has a card cavity for receiving the memory card therein, an engaging slot defined at a rear portion thereof adjacent to said card cavity and corresponding to said rear opening at the base member, and a pair of slide arms which is respectively formed at two opposite sides thereof for sliding in a corresponding guiding slot of the base member, each slide arm extending forwards to form a resilient arm, the resilient arm having a locking recess defined therein for engaging with said locking tab.

2. The memory card connector as claimed in claim 1, wherein said base member has a pair of said locking tabs respectively disposed on the two opposite sides thereof, with each locking tab extending into the corresponding guiding slot.

3. The memory card connector as claimed in claim 2, wherein the resilient arm has the locking recess defined in a middle section on the an outside surface thereof for engaging with the locking tab.

4. The memory card connector as claimed in claim 1, wherein said slide arms respectively extend downwards from the two opposite sides of the slide cover, and the resilient arm extended forwards from the each slide arm is formed in a cantilever manner.

5. The memory card connector as claimed in claim 1, wherein said base member has a pair of locking arms disposed at the rear portion thereof with said rear opening formed between the locking arms, and a pair of lateral walls with each having a reversed L-shape extending upwards from the two opposite sides thereof respectively with said guiding slots respectively defined between the lateral wall and each of the locking arms on the same side.

6. The electronic card connector as claimed in claim 4, wherein each locking arm of the base member has a positioning hook extending outwardly from a free end thereof, and the resilient arm of the slide cover has a projecting hook disposed at a free end thereof for engaging with the positioning hook so as to attach the slide cover to the base member.

7. The memory card connector as claimed in claim 1, wherein said base member has a pair of stops extending upwards on a front portion thereof for stopping the sliding of the slide cover.

8. The memory card connector as claimed in claim 1, wherein said slide cover further has an upper lid affixed thereto for covering the card cavity.

9. The memory card connector as claimed in claim 8, wherein said upper lid has a middle boss extending downwards therefrom for securing the memory card between the slide cover and the upper lid.

* * * * *